March 10, 1964 F. J. WILSON, JR 3,123,897
DISPOSABLE BIT LOCATING TOOL
Filed Sept. 26, 1962 2 Sheets-Sheet 1

FREDERICK J. WILSON, JR.
INVENTOR.

BY Albert Sperry
ATTORNEY

March 10, 1964
F. J. WILSON, JR
3,123,897
DISPOSABLE BIT LOCATING TOOL
Filed Sept. 26, 1962
2 Sheets-Sheet 2
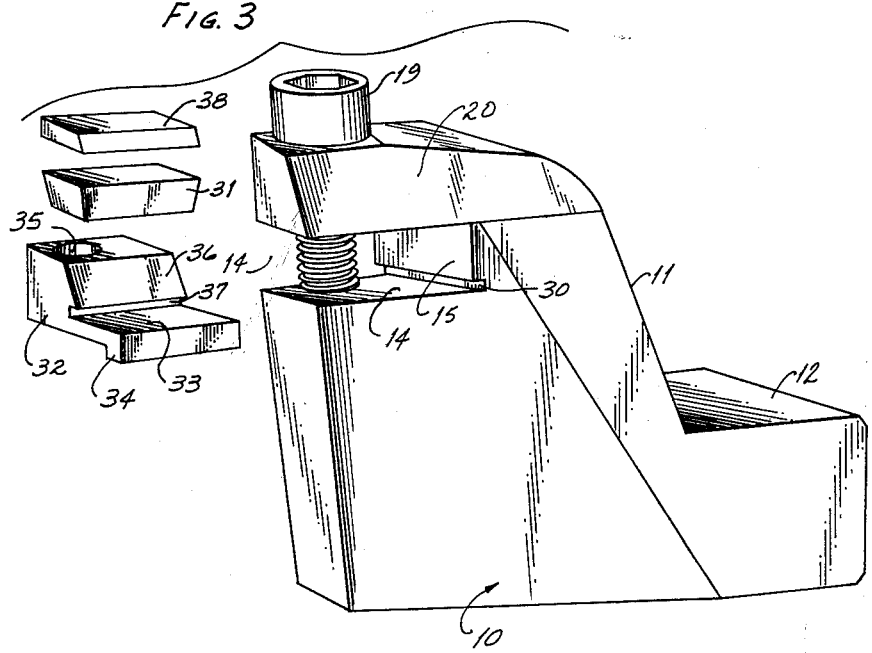
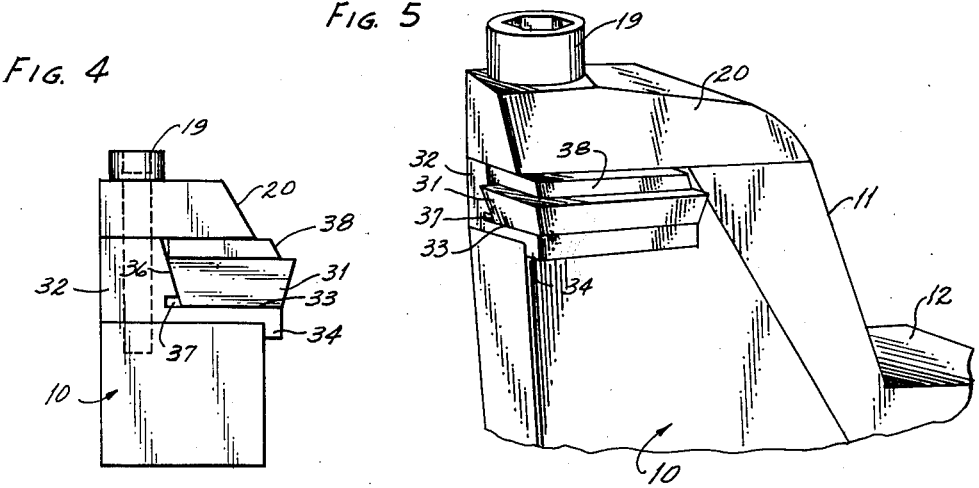
FREDERICK J. WILSON, JR.
INVENTOR.
BY *Albert Sperry*
ATTORNEY 3,123,897
DISPOSABLE BIT LOCATING TOOL
Frederick J. Wilson, Jr., Ansonia, Conn., assignor to The Apex Tool & Cutter Co., Inc., Shelton, Conn., a corporation of Connecticut
Filed Sept. 26, 1962, Ser. No. 226,370
6 Claims. (Cl. 29—96)

This invention relates to disposable bit locating tools and is particularly concerned with means for quickly and accurately locating and securely retaining a disposable bit in the preferable cutting position, and readily permitting release and relocation of the bit in an indexed position, whereby successive sides of the bit may be presented for use.

Modern metal working tools have increasingly adapted the use of disposable cutting bits. Such bits are conventionally thin, flat, usually rectangular pieces of appropriate metal cutting material and are mounted in cutter heads or locating tools where they are positioned to appropriately present a selected edge of the bit at the appropriate cutting position. To facilitate the quick and accurate location of the bit with the selected edge exposed for cutting it has been proposed that the locating tool be formed with angularly arranged inter-communicating slots whereby the juncture of the slots, which are arranged in adjacent parallel planes, present angularly related walls against which the inner faces of the bit may be contacted to insure the appropriate location of the bit. Such devices are disclosed in my companion application, Serial No. 226,369 filed Sept. 26, 1962 entitled "Tool Bits and Holders for Metal Working Tools," which application is here incorporated by reference.

While such construction of the locating tool is effective, efficient and extremely accurate, and represents advances over the prior art, it is, of course, obvious that formation of the tool with angularly related parallel and inter-communicating slots represents manufacturing complications, expenses and problems.

It is among the objects of the present invention to provide a novel and improved locating tool in which the facility of accurate insertion, location and securement of the bit, as in the use of the plural slot arrangement referred to, is achieved without requiring the complications of double slotting of the locating tool. Another object is to allow for the quick, accurate location and securement of the bit by a separable locating piece susceptible of selective application, to vary the tool to the use of a wide variety of sizes and shapes of disposable cutting bits. Other objects, features and advantages of the present invention will be apparent from a consideration of the following specification taken in conjunction with the accompanying drawings, in which FIG. 1 is an exploded view of one embodiment of the locating tool of the present invention;

FIG. 3 is a view similar to FIGURE 1, showing a combined tool seat and locating wall;

FIG. 4 is an end elevation of that form of the invention shown in FIGURE 3 and in assembled relationship; and FIG. 5 is an assembled view of that form of the invention shown in FIGURE 3.

As in the locating tool or cutting head of my companion application, above referred to, the tools 10 of both forms of the invention are of generally rectangular form, here shown with sloping rear faces 11 and projecting portions 12 to facilitate the mounting of the tool or head in a conventional holder for presenting the bit for the cutting operation in a metal working tool, in a manner well known to those skilled in the art.

Figure 1:
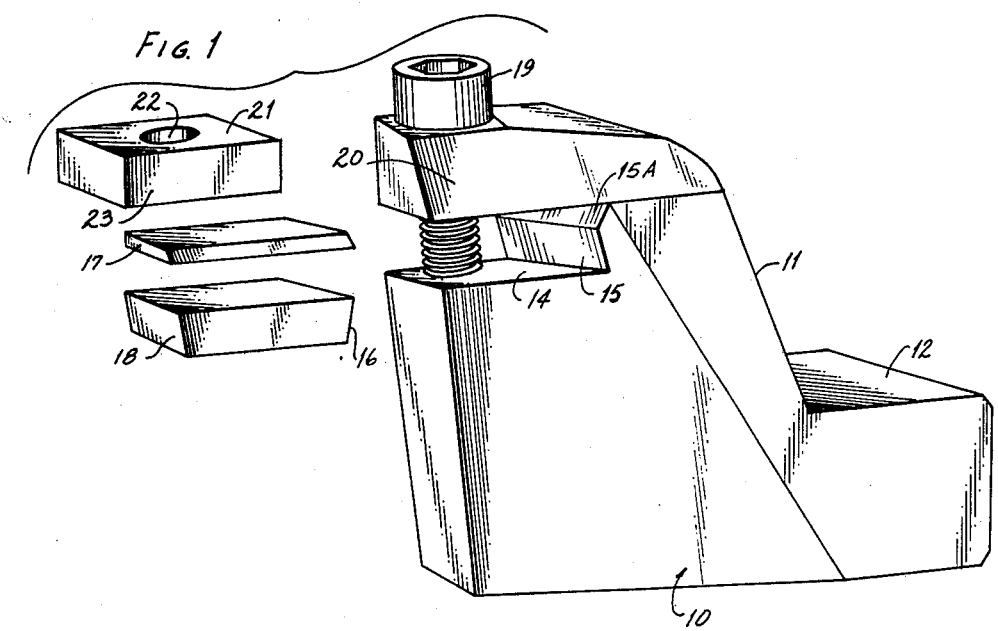
Figure 2:
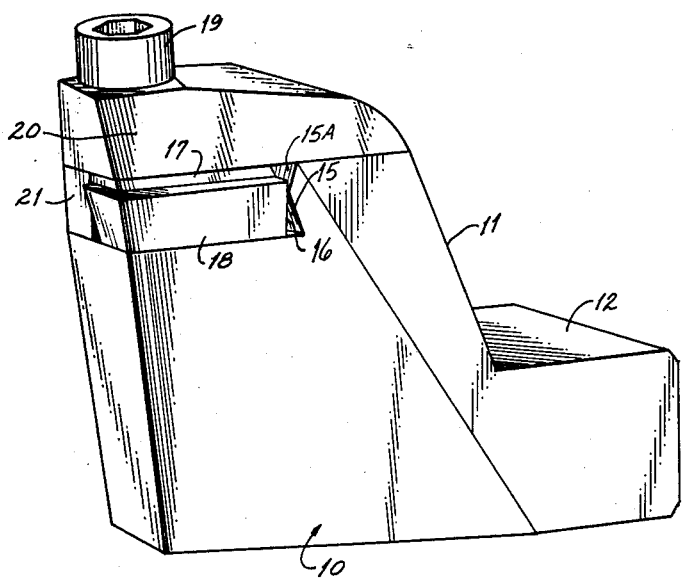
FIG. 2 is an assembled view of that form of the invention shown in FIGURE 1, with a disposable bit and a chip breaker or anvil shown in assembled relation properly located and secured.

In that form of the invention shown in FIGURES 1 and 2, the front face of the tool is furcated by the provision of a transverse slot 14, providing a rear or inner locating wall or face 15 and 15A. The wall 15A is preferably slanted with respect to the central vertical plane of the chip breaker 17 and/or bit 18, as indicated at 16, to provide a clearance for the inner edge of the bit 18 mounted within the furcation, so as to protect the cutting edge against wear, abrasion or damage while an adjacent edge is performing its cutting operation. Further wall 15 is preferably slanted. Such inclination of the wall 15 permits an accurate seating of the bit and/or anvil even though the formation of the transverse slot 14 is accomplished in a simple and possibly inaccurate cutting of the slot, which may leave a roughened corner or radius at the edges of the wall 15. Such roughness or radius would preclude the accurate setting of the bit and/or anvil.

The invention as here shown, has a top locking screw 19 which threadedly engages the lower body of the tool to force the upper projecting portion 20 of the furcation downward into engagement with the bit and/or its associat parts. While the wall 15 insures a rapid and quick location of the body of the locating tool, this form of the invention does not provide an integral wall formed by an angularly related slot for transverse location. To accomplish the same objective as a cooperating longitudinal wall of a communicating slot, there is provided a separate locating wall block 21, thinner than slot width to allow the slot to close, and preferably centrally apertured as at 22 to receive the shank of the locking screw 19 to locate the block in desired position so that its inner face 23 will be right-angularly directed with respect to the wall 15, thus forming a pair of right-angular walls against which the bit, anvil or chip breaker, may be quickly and accurately disposed to locate such parts as desired. The block may be located by pins or other close fitting means, other than the locking screw, when extreme locating accuracy is required.

In connection with the use of the locating block, it will be understood that regardless of the location of the bolt 19, selective blocks may be positioned within the furcation and secured by the bolt, providing for the use of various sizes and shapes of the bit 18. When bits of various sizes and shapes are to be used, a substitute block may be inserted in the furcation and secured by the bolt to provide various angularities between the block surface and the wall 15 and to provide various transverse locations of the block surface 23, thus to accommodate a wide variety of bit sizes and shapes. Block surface 23 may be shaped with appropriate angular face to conform to and fully support the face of the insert which rests against it.

From the foregoing, it wil be seen that the present invention provides a novel and improved means for quickly and accurately locating a tool bit in a locating tool, but avoids the necessity of double inter-communicating slots otherwise providing for the angularly related walls against which the bit is mounted to insure its proper location. The invention also provides an effective and efficient locating tool, the manufacture and assembly of which is materially improved with respect to ease and economy of manufacture. While the slot 14 may be of a height to receive and retain on the bit 18, a height to include an anvil (not shown) is deemed preferable. While the element 17 is designated as a chip breaker, it will be understood to cover an anvil as an alternative, or may be of such height as to include both. The general outline and configuraiton of the body of the tool is not critical and the inventive concept is readily applicable to milling cutters.

Referring to FIGURES 3, 4 and 5 of the drawings, it will be seen that the general principle of a through transverse slot in holder 10, identified by the numeral 14, is utilized in the manner referred to with respect to FIGURES 1 and 2. This slot provides a transverse vertical wall 15, similar to the wall 15 of FIGURE 1. However, in lieu of the angular disposition of the wall portions of FIGURE 1, the relief is provided by a horizontal base groove 30 by which the cutting edge of the bit 31 is protected, and such groove precludes any radius which may be formed without the requirement of precise milling operations. In this form of the invention, the back-up guiding block is a substantial equivalent to the block 21 of FIGURE 1, as indicated by the numeral 32. In this instance, however, the block is extended to form a seating platform 33 with a depending flange 34 adapted to engage the side face of the body 10 and thus properly and firmly locate the block 32. As in FIGURES 1 and 2, the block 32 is provided with an aperture 35 to receive therethrough the bolt 19. As will be noted more particularly in FIGURE 4, the upper face of the block 32 is provided with an inclined face 36 to receive the inclined inner face of the bit 31. Below the face 36 there is provided a groove 37 similar to the groove 30 but at right angles with respect thereto, such groove acting in the manner of groove 30 to preclude a radius between the surface 36 and the upper surface 33 of the receiving platform, and thus to insure a proper seating of the bit and chip breaker 38, or an anvil in addition thereto, free from contact at its lower edge.

Thus, it will be seen that in this form of the invention, shown in FIGURES 3 and 5, the general principles set forth with respect to FIGURES 1 and 2 are carried out, but in addition thereto, a seating platform is provided by the block and the depending flange 34 thereof bears against the side face of the body to insure a proper and automatic location of the block. In this form of the invention, it will of course be understood that the length of the platform may be varied to conform with the requirements of the bit used and that having been located, the block with its flange 34 against the side of the body, will be secured by a tightening of the bolt 19 passing through the aperture 35. It will, of course, be understood that the height of the block 32 may be varied as desired to receive thereover, not only the bit 31 and the breaker 38, but in addition thereto, an anvil, or it may be so dimensioned as to secure the bit 31 without the use of the breaker 38.

In this form of the invention, as well as that form of the invention shown in FIGURES 1 and 2, it will be understood that the invention is here shown by way of example and that in the practice of the invention, numerous changes, modifications and the full use of equivalents may be resorted to without departure from the spirit or scope of the invention, as outlined in the appended claims.

What I claim is:

1. A bit locating and retaining tool for disposable and indexible tool bits, including a body having a slot therein presenting a transverse horizontal surface and an element projecting over said surface, the inner wall of said slot defining a locating wall for one face of a disposable tool bit to be located in said slot, a locating block mounted within said slot, and a securing bolt extending through said element, said block, and said slot to threadedly engage the body below said slot, said block defining a locating wall angularly disposed with respect to the inner wall defined by said slot.

2. A bit locating and retaining tool for disposable and indexible tool bits, including a body having a slot therein presenting a transverse horizontal surface and an element projecting over said surface, the inner wall of said slot defining a locating wall for one face of a disposable tool bit to be located in said slot, a locating block mounted within said slot, a securing bolt extending through said element, said block, and said slot to threadedly engage the body below said slot, said block defining a locating wall right-angularly disposed with respect to the inner wall defined by said slot, the inner wall of said slot and the locating wall of said block defining reliefs to provide clearance for the inactive cutting edges of a disposable bit mounted in said slot.

3. A bit locating and retaining tool for disposable and indexible tool bits, including a body having a slot therein presenting a transverse horizontal surface and an element integral with said body projecting over said surface, the inner wall of said slot defining a locating wall for one face of a disposable tool bit to be loctated in said slot, a locating block mounted within said slot, and a securing bolt extending through said element, said block, and said slot to threadedly engage the body below said slot, said block defining a locating wall right-angularly disposed with respect to the inner wall defined by said slot, a tool bit positioned within said slot and having adjacent sides thereof engaging the inner wall of the slot and the locating wall of said block, the height of said slot exceeding the thickness of said bit, and a chip breaker located in said slot between said bit and the projecting element on said body.

4. A bit locating tool, including a body defining a bit receiving recess forming a locating abutment wall for one edge of a tool bit, a block located within said recess forming an adjacent locating abutment wall projecting from one edge of the block into position to engage an adjacent edge of a tool bit, and an extension on said block forming a bit receiving surface, said extension including a flange located on the opposite edge of said block and extending generally parallel to the abutment wall on the block, said flange being engageable with said body to assist in the fixed location of said block with respect to said body.

5. A bit locating and retaining tool for disposable and indexible tool bits, including a body having a slot therein presenting an upwardly facing transverse horizontal surface and a projecting body portion presenting a downwardly facing surface spaced from said horizontal edge surface, the inner wall of said slot defining a locating wall for one edge of a disposable tool bit to be located in said slot, a locating block mounted within said slot, and a securing bolt extending through said projecting portion of said body, said block, and said slot to threadedly engage the body below said slot, said block defining a locating wall right-angularly disposed with respect to the inner wall defined by said slot.

6. A tool as defined in claim 5 in which the block includes an extension providing a surface normal to said walls for receiving a bit and a depending flange engageable with the side of the body to locate said block.

References Cited in the file of this patent

UNITED STATES PATENTS

| | | |
|---|---|---|
| 2,181,023 | Moore | Nov. 21, 1939 |
| 2,887,760 | Armstrong | May 26, 1959 |
| 2,967,442 | Forsyth | Jan. 10, 1961 |
| 2,982,008 | Facknitz | May 2, 1961 |
| 3,066,385 | Vana | Dec. 4, 1962 |

FOREIGN PATENTS

| | | |
|---|---|---|
| 214,221 | Australia | Mar. 25, 1958 |